(12) United States Patent
Cheesman et al.

(10) Patent No.: US 6,680,933 B1
(45) Date of Patent: Jan. 20, 2004

(54) TELECOMMUNICATIONS SWITCHES AND METHODS FOR THEIR OPERATION

(75) Inventors: Julian J. Cheesman, Kanata (CA); Norman A. Lyon, Hull (CA); Stacy S. Nichols, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/401,955

(22) Filed: Sep. 23, 1999

(51) Int. Cl.$^7$ .................... H04L 12/66; H04L 12/28; H04L 12/96

(52) U.S. Cl. ............. 370/352; 370/389; 370/395.21; 370/395.4; 370/395.43; 370/395.52; 370/392

(58) Field of Search ................ 370/352, 389, 370/395.21, 395.4–395.43, 395.52, 392, 412–414, 229–230, 474–475, 466–468, 397–399, 395.72, 415–418, 428–429

(56) References Cited

U.S. PATENT DOCUMENTS

| | | | |
|---|---|---|---|
| 5,831,980 A | | 11/1998 | Varma et al. |
| 5,850,399 A | | 12/1998 | Ganmukhi et al. |
| 6,084,879 A | * | 7/2000 | Berl et al. ............ 370/389 |
| 6,097,722 A | * | 8/2000 | Graham et al. ....... 370/395.21 |
| 6,115,373 A | * | 9/2000 | Lea ........................ 370/355 |
| 6,330,614 B1 | * | 12/2001 | Aggarwal et al. ..... 709/236 |
| 6,452,915 B1 | * | 9/2002 | Jorgensen ............. 370/338 |
| 6,526,056 B1 | * | 2/2003 | Rekhter et al. ........ 370/392 |
| 2002/0097725 A1 | * | 7/2002 | Dighe et al. .......... 370/395.1 |

FOREIGN PATENT DOCUMENTS

EP 0 901 307 A 3/1999

* cited by examiner

Primary Examiner—Dang Ton
Assistant Examiner—Ronald Abelson
(74) Attorney, Agent, or Firm—Jean-Pierre Fortin

(57) ABSTRACT

A telecommunications switch for switching protocol data units across communications links connecting the switch into a communications network and supporting multiple service types concurrently is disclosed. The switch includes an ingress processor for receiving protocol data units from a communications link, an egress processor for transmitting protocol data units onto another communications link, and a switching fabric for routing protocol data units from the ingress processor to the egress processor. The switch includes a structure of queues and schedulers that is arranged to provide concurrent class-based and flow-based queuing and scheduling of the protocol data units. This arrangement allows an amount of switching bandwidth to be guaranteed to protocol data units belonging to a given flow and allows classes of service within the flow to be allocated a relative proportion of that bandwidth. The structure is re-configurable in its interconnection of queues and schedulers via a link list in which pointers to the queues and schedulers are stored and updated as required.

19 Claims, 8 Drawing Sheets

TELECOMMUNICATIONS SWITCHES AND METHODS FOR THEIR OPERATION

FIELD OF THE INVENTION

The present invention relates to telecommunications switches and methods for their operation and is particularly concerned with such switches and methods for providing services such as Asynchronous Transfer Mode (ATM), Frame Relay (FR), and Internet Protocol (IP).

BACKGROUND OF THE INVENTION

The Internet is driving growth in the requirement for Carriers to support connectionless protocols such as IP in their networks. IP appears to be the predominant technology for network applications, however, IP has traditionally only supported best effort delivery. Recently, initiatives by the Internet Engineering Task Force (IETF) have been directed to enhance the capability of IP to include class of service (CoS) and traffic engineering capabilities. Examples of two such initiatives are Multi-Protocol Label Switching (MPLS) and Differentiated Services. MPLS is being defined to support constraint based routing as a mode to supplement existing dynamic hop by hop routing. The proposed Constraint based Routing Label Distribution Protocol (CR-LDP) allows traffic parameters and routing topology to be specified per flow. Differentiated Services defines how a packet is tagged to receive prioritised Class of Service treatment at each hop. Typically, this maps directly to prioritized queuing treatment within a router.

The IP enhancements discussed above provide capabilities that are similar to that offered by Asynchronous Transfer Mode (ATM) and Frame Relay (FR) technology. Indeed, some carriers are considering deploying FR, ATM and IP communications services. However, fundamental differences between ATM, FR, and IP protocols have required different switching systems, resulting in separate networks for each service.

SUMMARY OF THE INVENTION

An object of the present invention is to provide improved telecommunications switches and methods for their operation.

According to an aspect of the present invention there is provided a telecommunications switch for switching protocol data units between communications links connecting the telecommunications switch into a communications network. The telecommunications switch is operable to switch protocol data units of a plurality of services simultaneously and includes a structure of queues and schedulers associated with one of the communications links. The structure of queues and schedulers is operable to provide a traffic management function which includes class-based traffic management and flow-based traffic management. The structure of queues and schedulers is arranged to provide for each service of the plurality of services one of class-based traffic management, flow-based traffic management, and traffic management that is both class-based and flow-based.

Embodiments of the invention allow a Carrier to support existing class-based traffic managed services and existing flow-based traffic managed services, while at the same time offer new services that involve a combination of class-based and flow-based traffic management.

According to an aspect of the present invention there is provided a telecommunications switch for switching protocol data units across communications links connecting the switch into a communications network. The switch includes an ingress processor for receiving protocol data units from a communications link; an egress processor for transmitting protocol data units onto another communications link; a switching fabric for routing protocol data units from the ingress processor to the egress processor. The switch further includes a plurality of queues having a first queue for flow-based queuing a first portion of the protocol data units routed by the switching fabric, and a group of queues for class-based queuing a second portion of the protocol data units routed by the switching fabric. The switch still further includes a plurality of schedulers having a first scheduler assigned to the group of queues and a second scheduler assigned to the first queue and the first scheduler. By this assignment the second scheduler is operable to provide scheduling of the first and second portions of the protocol data units for transmission onto the another communications link.

Embodiments of the invention allow a Carrier to support class-based queued services and flow-based queued services on the same switch.

Conveniently, the plurality of queues further includes another group of queues for flow-based with class-based sub-flow queuing a third portion of the protocol data units routed by the switching fabric. Also conveniently, the plurality of schedulers further includes a third scheduler assigned to the another group of queues, and the first scheduler is also assigned to the third scheduler. By this assignment, the first scheduler is operable to provide scheduling of the second and third portions to the second scheduler. These features allow a Carrier to support a service that is requires a combination of class-based queuing and flow-based queuing. For example, this feature allows a Carrier to provide a new type of Virtual Private Network (VPN) service. This service would allow an amount of bandwidth to be guaranteed to a VPN, while service classes within the VPN could each be allocated a relative proportion of the guaranteed bandwidth.

Conveniently, the second scheduler is a priority scheduler and the first and third schedulers are weighted fair queuing schedulers.

Conveniently, the telecommunications switch further includes a re-configurable interconnect which connects at least a queue of the plurality of queues and a scheduler of the plurality of schedulers in a re-configurable manner, whereby an assignment of a scheduler to a queue is selectively changeable. This feature allows a Carrier operating the switch to re-configure the switch to support more services, to make changes to existing services, and to add new services as required.

Conveniently, the plurality of schedulers comprises scheduler modules, each of which includes a priority scheduler and a weighted-fair queuing scheduler.

According to another aspect of the invention there is provided a telecommunications switch for switching protocol data units between communications links connecting the telecommunications switch into a communications network. The telecommunications switch is operable to switch protocol data units of a plurality of services simultaneously. The telecommunications switch includes an ingress processor for receiving protocol data units from a communications link, an egress processor for transmitting protocol data units onto another communications link, a switching fabric for routing protocol data units from the ingress processor to the egress processor. The telecommunications switch further includes and a structure of queues and schedulers associated with one of the communications links. The structure of queues and schedulers are operable to provide a traffic management function. The structure of queues and schedulers are arranged to provide class-based traffic management and flow-based traffic management individually or in combination on a per service basis. The traffic management function includes the queuing and scheduling of protocol data units of one or more of the plurality of services concurrently.

Conveniently, the egress processor is operable to associate a queue identifier with a protocol data unit. Also conveniently, the structure of queues and schedulers is operable to perform queuing and scheduling of the protocol data unit on a class-basis according to the queue identifier. This feature enables connectionless-like Class of Service (CoS) functionality to be provided.

Conveniently, the egress processor is operable to associate a flow identifier with a protocol data unit based on a traffic flow associated with the protocol data unit. Also conveniently the structure of queues and schedulers is operable to perform queuing and scheduling of the protocol data units on a flow-basis according to the flow identifier. This feature enables connection-oriented-like Quality of Service (QoS) functionality to be provided.

Conveniently, the ingress processor is operable to encapsulate the protocol data units with a switch tag that includes an indication of a service and a traffic flow associated with the protocol data unit, whereby the telecommunications switch can switch protocol data units of different services.

Conveniently, the structure of queues and schedulers comprises a re-configurable interconnect which connects the queues and schedulers of the structure in a re-configurable manner, whereby an arrangement of class-based scheduling, flow-based scheduling, and scheduling that is a combination of class-based and flow-based scheduling is selectively changeable.

Conveniently, the schedulers of the structure of queues and schedulers further comprise scheduler modules and wherein each scheduler module includes a priority scheduler and a weighted-fair queuing scheduler.

Conveniently, the scheduler modules are connected to the queues by the re-configurable interconnect in a re-configurable manner, whereby the connection between a queue and a scheduler module is selectively changeable.

According to another aspect of the present invention there is provided a method of switching label encapsulated protocol data units in a telecommunications switch connected into a communications network via communications links. The telecommunications switch includes a switching fabric, an ingress processor, an egress processor, and a structure of queues and schedulers configured to provide class-based scheduling, flow-based scheduling, and scheduling that is a combination of class-based and flow-based scheduling. The method comprises the steps of:

receiving, by the ingress processor, a label encapsulated protocol data unit from the network over one of the communications links;

examining, by the ingress processor, the label of the label encapsulated protocol data unit;

determining, by the ingress processor and in dependence upon the content of the label, a service and a traffic flow associated with the label encapsulated protocol data unit;

encapsulating, by the ingress processor, the label encapsulated protocol data unit with a switch tag;

transferring, by the ingress processor, the switch tag encapsulated protocol data unit to the switching fabric;

switching, by the switching fabric and in dependence upon the contents of the switch tag, the switch tag encapsulated protocol data unit to the egress processor;

determining, by the egress processor and responsive to the contents of the switch tag, a queue of the structure of queues and schedulers with which the switch tag encapsulated protocol data unit is to be associated; and transmitting, by the egress processor and responsive to a scheduler of the structure of queues and schedulers indicating that the switch tag encapsulated protocol data unit is scheduled for transmission, the label encapsulated protocol data unit onto another of the communications links.

According to yet another aspect of the invention there is provided a structure of queues and schedulers for a telecommunications switch. The structure includes a plurality of queues and a plurality of schedulers. A portion of the schedulers are connected to the queues and the remainder of the schedulers are interconnected to form a scheduling hierarchy which is operable to provide class-based scheduling, flow-based scheduling, and scheduling that is a combination of class-based and flow-based scheduling.

Conveniently, the structure further includes a re-configurable interconnect connecting the queues and schedulers in a re-configurable manner, whereby an arrangement of class-based scheduling, flow-based scheduling, and scheduling that is a combination of class-based and flow-based scheduling is selectively changeable.

Conveniently, the plurality of schedulers comprises scheduler modules, each of which includes a priority scheduler and a weighted-fair queuing scheduler.

According to still another aspect of the present invention there is provided a structure of queues and schedulers for queuing and scheduling protocol data units for transmission in a telecommunications switch. The structure includes a plurality of queues having a first queue for flow-based queuing a first portion of the protocol data units and a group of queues for class-based queuing a second portion of the protocol data units. The structure further includes a plurality of schedulers including a first scheduler assigned to the group of queues and a second scheduler assigned to the first queue and the first scheduler, whereby the second scheduler is operable to provide scheduling of the first and second portions for transmission.

Conveniently, the plurality of queues further includes another group of queues for flow-based with class-based sub-flow queuing a third portion of the protocol data units. Also conveniently, the plurality of schedulers further includes a third scheduler assigned to the another group of queues, and the first scheduler is assigned also to the third scheduler, whereby the first scheduler is operable to provide scheduling of the second and third portions to the second scheduler.

Conveniently, the second scheduler is a priority scheduler and the first and third schedulers are weighted fair queuing schedulers.

Conveniently, the structure further includes a re-configurable interconnect which connects at least a queue of the plurality of queues and a scheduler of the plurality of schedulers in a re-configurable manner.

Features described above may be combined as would be apparent to a skilled person, and may be combined with any aspect of the invention.

BRIEF DESCRIPTION OF THE DRAWINGS

Embodiments of the invention are described below, by way of example only, with reference to the drawings in which.

DETAILED DESCRIPTION

Figure 1:
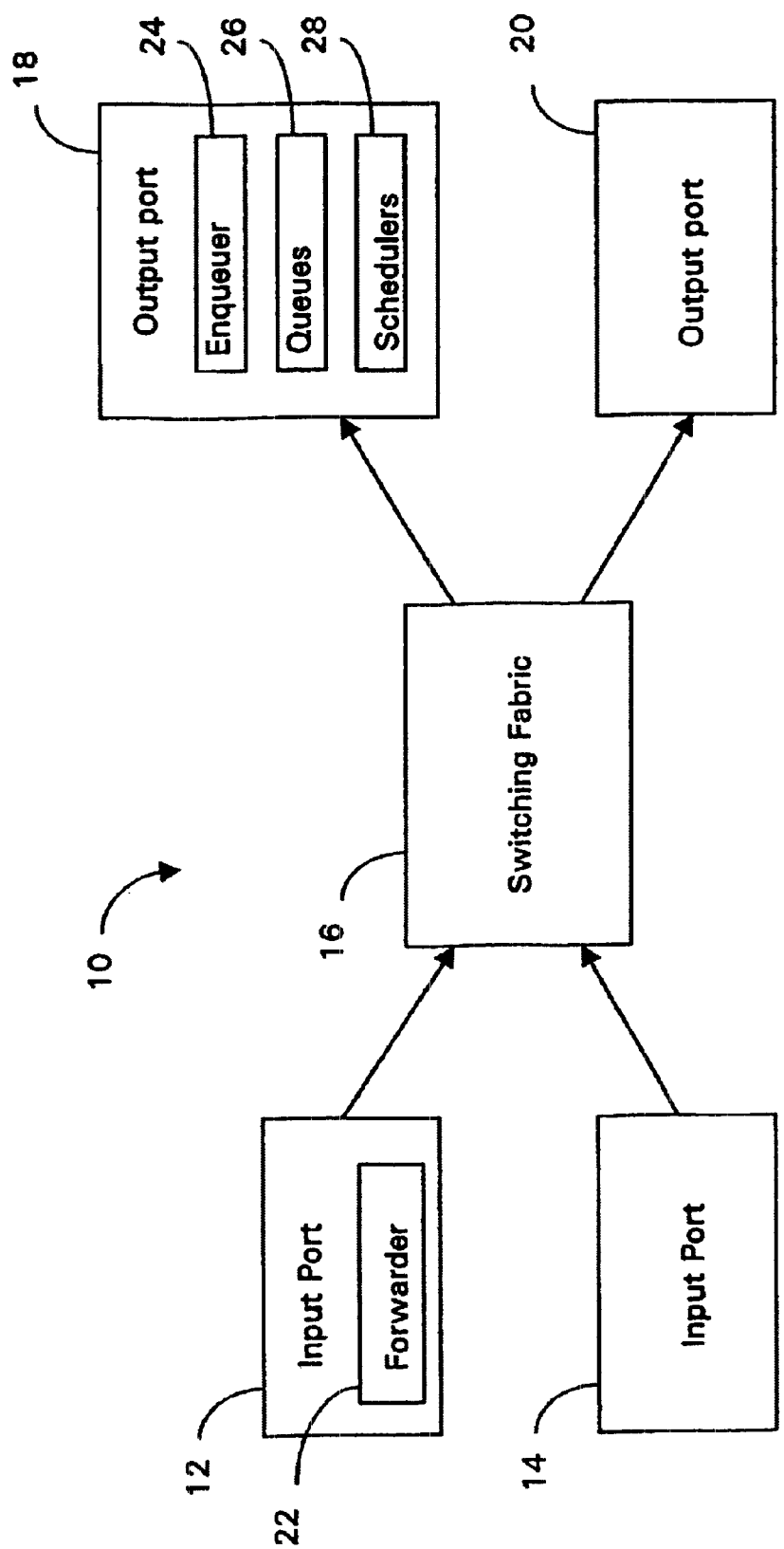
FIG. 1 is a functional block diagram of a generic switch known in the art.

FIG. 1 is a functional block diagram of generic switch known in the art. A router also displays the same functionality on the level of detail depicted in FIG. 1. The switch 10 includes input ports 12, 14 which are connected a switching fabric 16. The switching fabric is connected to output ports 18, 20. Input port 12 includes a forwarder 22 connected to its input. The output port n includes an enqueuer 24 connected to its input, queues 26 connected to the enqueuer 24, and schedulers 28 connected to the queues 26. The input ports 12, 14 are identical in their structure. Likewise, the output ports 18, 20 have the same structure.

ATM cells, in the case of an ATM switch, or IP packets, in the case of an IP router, arrive at the input port and are forwarded to the switching fabric 16 where they are directed to the appropriate output port 18, 20. Hereinafter, ATM cells and IP packets will be collectively referred to as protocol data units (PDUs). The forwarder 22 looks up the appropriate output port for each PDU. In the case of a switch, which handles connection oriented PDUs, the look-up depends on a connection identifier (CI). In the case of a router, which handles connectionless, PDUs, the look-up depends on a destination address contained in the PDU. Generally, the forwarder 22 encapsulates the PDU with a header that contains the information from the look-up and forwards the encapsulated PDU to the switching fabric 16.

Figure 2:
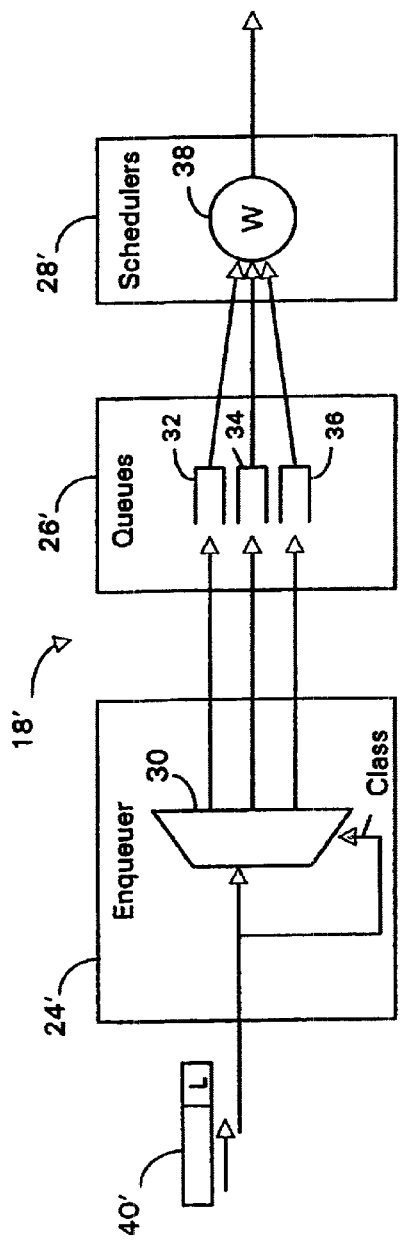
FIG. 2 is a functional block diagram of a typical output port of a differentiated services router known in the art.

FIG. 2 is a functional block diagram of a typical output port 18' of a router known in the art for routing differentiated services tagged IP packets. Referring to FIG. 2, the structure and operation of the output port 18' will be described. The output port 18' includes an enqueuer 24' connected at its input, a set of queues 26' connected to the enqueuer 24', and a scheduler 28' connected to the set of queues 26'. The enqueuer 24' includes a selection block 30. For simplicity, in this example the set of queues 26' includes three queues 32, 34, and 36. The scheduler 28' includes a weighted fair queuing (WFQ) scheduler 38. In operation, the output port 18' receives an encapsulated PDU 40 from the switching fabric 16. The encapsulated PDU 40 has a header, which contains a label (L) that specifies a class to which the PDU belongs. The enqueuer 24' examines the header of the encapsulated PDU. The selection block 30 determines into which of the queues 32, 34, 36 the PDU should be sent based on the class of the PDU. Alternatively, the forwarder 22 could provide this function of enqueuing, that is, enqueuing can be done at the input or output side of the switch or router. Typically, there is one queue per class. The scheduler 38 determines from which queue 32, 34, 36 the next PDU to be transmitted will be selected. PDUs are selected from the queues in a first-in-first-out (FIFO) basis.

Typically, a WFQ scheduler is used. A relative weight is assigned to each of the output queues 32, 34, 36. Each offered service has one queue assigned to it, hence each service receives a proportion of the total bandwidth that the queues 32, 34, 36 receive. This proportion is dependent on the relative weighting assigned to the particular queue. In this way differentiated services tagging provides classes of service. However, delivery of PDUs is on a best-effort basis for all classes of service. Furthermore, although a service is assigned a relative proportion of output port bandwidth, packets of the same service type arriving from different sources will be in competition for their share of that apportionment. Thus, a service subscriber is not guaranteed any particular share of that apportionment.

An example of an Internet service that could be provided with a network of such differentiated services compatible routers is a class based virtual private network (CB-VPN). For example, three classes of VPN service, labelled gold, silver and bronze, could be provided. The gold class VPN service would have a larger portion of bandwidth than the silver class VPN service, and likewise, the silver class VPN service would have a larger portion of bandwidth than the bronze class VPN service. In the network, PDUs from each service class (i.e. gold, silver, bronze), would be queued with PDUs of the same class. For example, PDUs from the gold class VPN service would be queued with other PDUs of the same class in the queue 32 of FIG. 2. The queues 32, 34, 36 are assigned a relative weighting, resulting in a relative proportion of bandwidth, however delivery of PDUs for all service classes is on a best-effort basis. That is, no amount of bandwidth is guaranteed. A customer would subscribe to one of the VPN service classes and a particular VPN (i.e. VPNx) would be assigned to that customer. The PDUs from different particular VPNs within the same service class would be competing for their share of bandwidth within that class. Thus, the Carrier providing the CB-VPN to its customer could commit to a service level agreement (SLA) that specified the connection through the network, class of VPN service, and a specific amount of bandwidth, but the network could not guarantee that bandwidth to the customer.

Connection oriented protocols such as Frame Relay and ATM have traditionally provided QoS and connection-based traffic engineering capabilities in the Carrier's network. In the case of ATM, the QoS includes four types of service, which generally relate to guarantees given to the user involving cell delay, bandwidth, and cell loss ratio. These service types are: constant bit-rate (CBR), variable bit-rate (VBR), available bit-rate (ABR), and unspecified bit-rate (UBR). The particular type of service is negotiated between the user and network connection admission control (CAC) at the time the connection is set up. A particular service type request for a connection may be denied at the time of connection set up if the network cannot provide the required amount of bandwidth. However, once a connection is set up, the amount of bandwidth available to the connection is guaranteed by the network.

Figure 3:
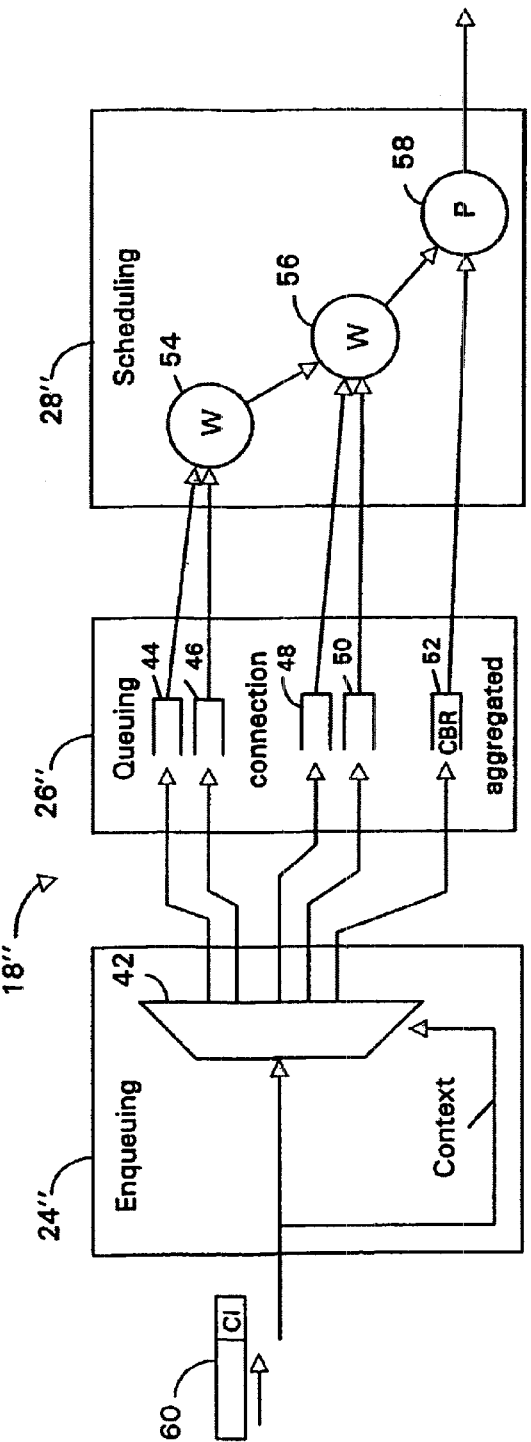
FIG. 3 is a functional block diagram of a typical output port of an ATM switch known in the art.

FIG. 3 is a block diagram of a typical output port 18" of ATM switch known in the art. Referring to FIG. 3, the structure and operation the output port 18" will be described. The output port 18" includes an enqueuer 24" connected at its input, a set of queues 26" connected to the enqueuer 24", and a scheduler 28" connected to the set of queues 26". The enqueuer 24" includes selection block 42. The set of queues 26" includes connection queues 44, 46, and aggregated connection queues 48, 50, including a CBR queue 52. There may be many connection queues, however only two are shown for simplicity. The connection queues are for queuing PDUs on a per connection basis, whereas the aggregated connection queues are for aggregating PDUs of the same QoS type (e.g. CBR, VBR, ABR, UBR) from different connections. Typically, there would be an aggregated connection queue for each QoS type. The CBR queue 52 is for queuing all of the CBR type PDUs flowing into the output port 18". A connection is assigned to a queue when the connection is set up. The scheduler 28" includes three levels of schedulers. The first level comprises a priority scheduler 58 connected to the CBR queue 52, which has the highest priority. That is, the priority scheduler 58 services PDUs from the CBR queue 52 before any of the other queues are serviced. The second level comprises a WFQ scheduler 56 connected to the aggregated connection queues 48, 50 and the priority scheduler 58. The third level comprises another WFQ scheduler 54 connected to the connection queues 44, 46 and the WFQ scheduler 56.

In operation, an encapsulated PDU 60 arrives at the output port 18" from the switching fabric 16. The PDU 60 includes a connection identifier (CI) which has a context associated with it. The selection block 42 uses this context to determine into which of the queues 44–52 the PDU should be sent. The priority scheduler 58 determines whether the CBR queue 52 or the WFQ scheduler 56 should be served. The WFQ scheduler 56 is served whenever the CBR queue 52 is empty. The WFQ scheduler 56 serves the other WFQ scheduler 54 or one of the aggregated connection queues 48, 50 according to their relative weighting. Likewise, the other WFQ scheduler 54 serves one of the connection queues 44, 46 according to their relative weighting. That is, the WFQ schedulers 54, 56 perform weighted fair scheduling of their respective queues.

An ATM switch is intended to provide guaranteed QoS; often meaning guaranteed bandwidth, on a per connection basis. If a source of cells exceeds the committed information rate (CIR) of its connection, cells from other sources may suffer a diminished QoS if the exceeding source is successful in obtaining more than its committed portion of bandwidth. For example, a source of cells might be physically connected to the input port by an OC-3 (155 Mbs) link, but only have a 20 Mbs CIR. If that source sends cells to the input port at the OC-3 rate, it could impact the QoS of other sources being serviced by the same switch. Hence, it follows that the CIR must be enforced on a per connection basis.

An example of an Internet service that could be provided with a network of ATM switches is a QoS-based VPN (Q-VPN) service. With such a service, QoS for the VPN is negotiated when the connections for it are set up and is guaranteed thereafter. However, in order that a VPN does not adversely affect other service commitments made of the switch, the CIR of the VPN needs to be enforced as described above.

Figure 4:
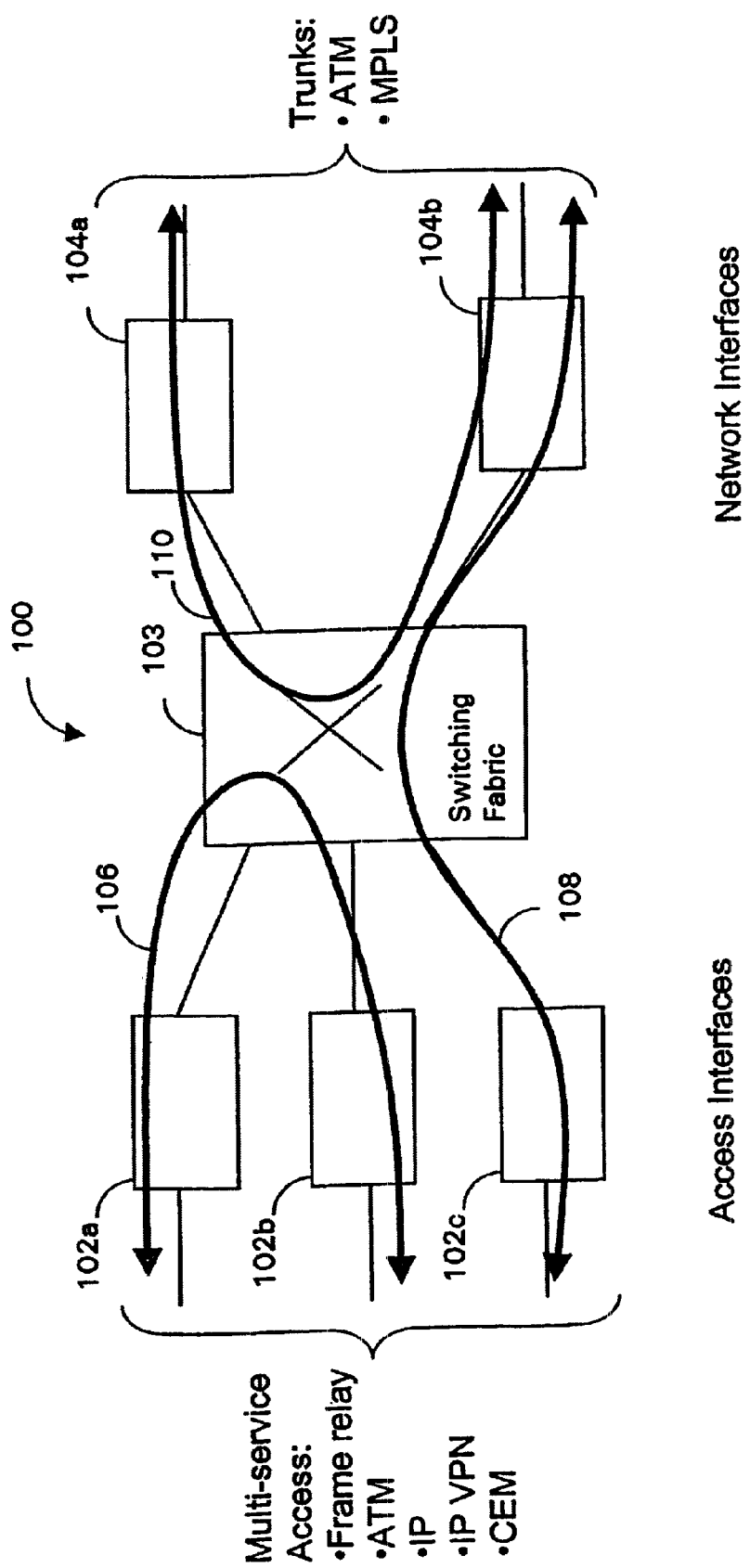
FIG. 4 is a functional block diagram of a telecommunications switch in accordance with an embodiment of the present invention.

Referring to FIG. 4 there is illustrated a telecommunication switch 100 in accordance with an embodiment of the present invention.

The switch 100 is a multi-service switching system with access interfaces 102a, 102b, 102c capable of supporting different service types, a switching fabric 103, and network interfaces 104a, 104b capable of supporting different trunk technologies. Three major flow topologies 106, 108, 110 are also shown. The first flow 106 is intra-switched between the access interfaces 102a and 102b. The second flow 108 originates and terminates network traffic that passes between thy access interface 102c and the trunk interface 104b. The third flow 110 comprises tandem traffic that passes between the trunk interfaces 104a and 104b, and therefore does not originate nor terminate on an access interface in the switch 100.

The services supported by the switch 100 include connection-oriented and connectionless type services for example ATM, Frame Relay, IP and IP VPN services. The services supported by the switch 100 require Class of Service (CoS) and Quality of Service (QoS) modes of traffic management. The switch 100 is able to provide these modes concurrently on an access interface 102. That is, the access interfaces of the switch 100 are capable of providing hybrid behaviour with respect to traffic management. The trunk technologies supported by the network interfaces 104a, 104b could be ATM or MPLS for example.

Figure 5:
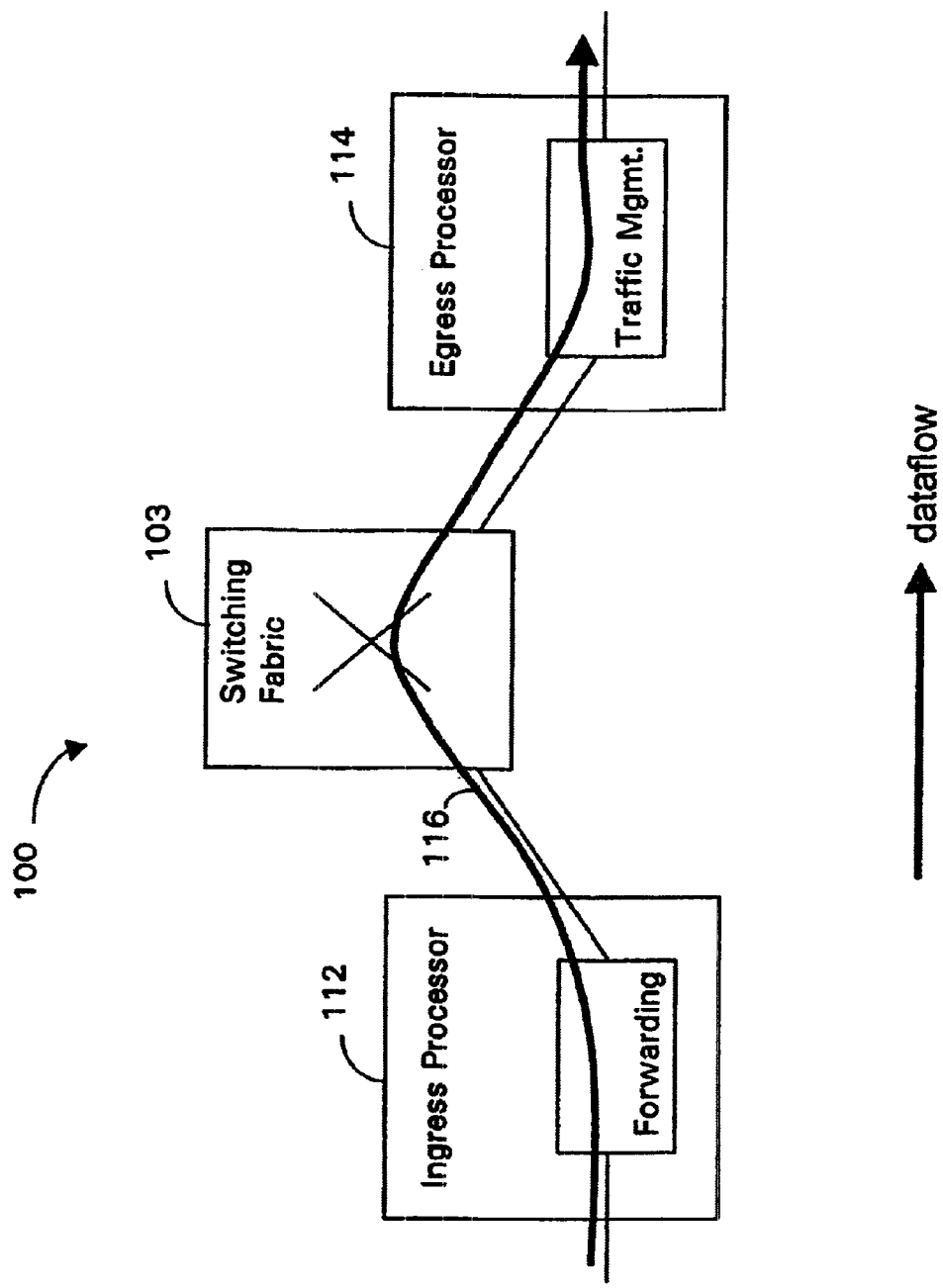
FIG. 5 is a functional block diagram depicting the switch of FIG. 4 in an unfolded view.

FIG. 5 is an unfolded view of the switch 100 of FIG. 4. The switch 100 includes an ingress processor 112, connected to a switching fabric 103, which is connected to an egress processor 114. Traffic flow 116 is shown passing into the ingress processor 112, through the switching fabric 103, and out through the egress processor 114.

The functionality of the switch 100 is partitioned into forwarding, switching, and traffic management which are performed by the input processor 112, the switching fabric 103, and the egress processor 114, respectively.

The ingress processor 112 parses each incoming protocol data unit to determine the service to which it belongs. For example, a protocol data unit could belong to an ATM bearer virtual channel or an IP/MPLS label switched path. The ingress processor 112 then undertakes a look up of the Layer 3 network address or the Layer 2 label (as appropriate to the service) in order to determine a destination port within the switch 100.

The destination port would be of one of the access interfaces 102a, 102b, 102c or the network interfaces 104a, 104b. An internal encapsulation protocol is used by the switching fabric 103 to route the protocol data units. The ingress processor 112 encapsulates the protocol data unit with a switching tag and the encapsulated protocol data unit is queued to await transfer across the switching fabric 103. The switching tag includes information of the destination port within the switch 100 as well as service-related information. The switch 100 supports cell (e.g. ATM) and packet (e.g. IP) switching. For the latter, a segmentation and re-assembly protocol is used across the switching fabric 103 to segment protocol data units for switching. This segmentation is done in order to control the latency of high priority traffic. The functionality described above is generally referred to as 'forwarding'.

The switching fabric 103 is service independent. It operates on the internal encapsulation protocol to route protocol data units to their destination port. The switching fabric 103 provides basic absolute priority treatment, that is, it separates traffic into a small number of queues. The function of the switching fabric 103 can be implemented as a common memory buffer, as distributed memory, as a pure spatial bus, or a combination of these, as is known in the art.

The egress processor 114 parses the protocol data units received from the switching fabric 103 to determine the required type of scheduling and queuing treatment. For example, this treatment will be one of: per connection queuing or aggregated connection queuing for ATM traffic; per class queuing for IP traffic; and per flow with class sub-queuing on a per VPN basis for IP VPN traffic. The egress processor 114 tags a protocol data unit for treatment using a flow identifier and a queue identifier, thereby separating the functions of queuing from flow management.

Figure 6:
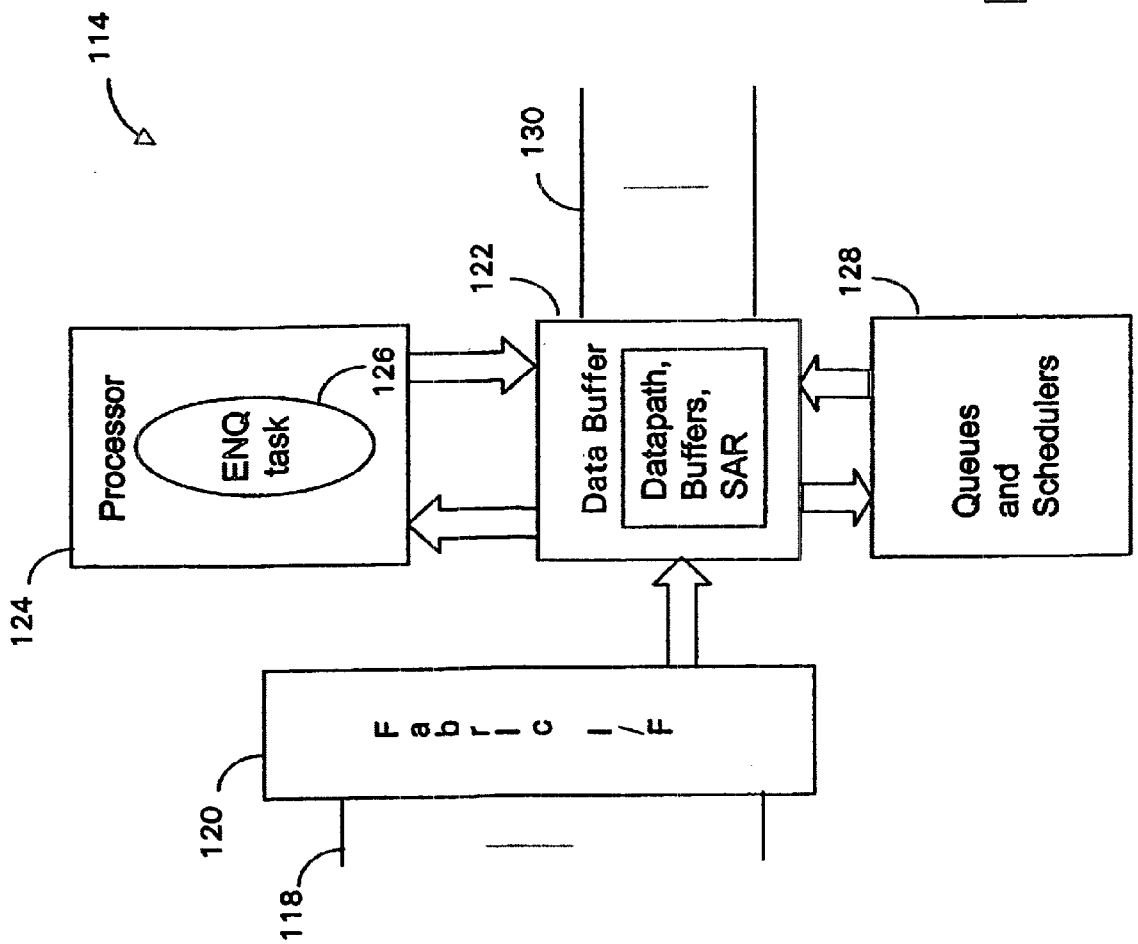
FIG. 6 is a functional block diagram of the egress processor of FIG. 5.

FIG. 6 is a functional block diagram of the egress processor 114. The figure shows the main functional blocks of the egress datapath and identifies the flow of data between them. A fabric interface 120 transfers protocol data units from a switching fabric link 118 to a data buffer 122. The data buffer 122 transfers protocol data units to a processor 124, receives protocol data units from the processor 124, and transfers protocol data unit references to a structure 128 of queues and schedulers. The structure 128 of queues and schedulers requests transmission of protocol data units onto an egress link 130. Although FIG. 6 shows one switching fabric link 118 and one egress link 130, there are actually a plurality of such links. For example, in the present embodiment there are forty-eight such links. Accordingly, the data buffer 122, processor 124, and structure 128 of queues and schedulers have a corresponding capability, provided via time sharing, to support forty-eight parallel data paths. Alternatively to time sharing, the data buffer 122, processor 124, and structure 128 of queues and schedulers could have a width of forty-eight parallel data paths.

The fabric interface 120 terminates the traffic flow 116 of protocol data units from the switching fabric 103 and undertakes data transfer rate adaptation. The protocol data units are transferred into the data buffer 122 where re-assembly of segmented protocol data units occurs. Reassembled protocol data units are passed into the processor 124 where they are submitted to an enqueue task 126. The enqueue task 126 parses each protocol data unit to determine its service and to classify the protocol data unit for queuing and scheduling treatment. The enqueue task 126 also provides encapsulation of each protocol data unit for its transmission on the egress links 130. Examples of service and protocol data unit classification are provided in FIG. 7. ATM bearer traffic is able to bypass the enqueue task 126, since the connection look up and context can be provided entirely within the data buffer block 122. However, ATM traffic may also be passed to the enqueue task 126 as well.

The data buffer 122 receives classified protocol data units from the processor 124 and combines them with the flow through ATM traffic. A protocol data unit reference (usually a buffer memory pointer) is passed into the structure 128 of queues and schedulers. Each protocol data unit reference is tagged with a queue identifier, which directs it into a specific queue. The protocol data unit references are also tagged with a flow identifier, which associates it to a flow context. The flow context is useful for several purposes, one of which is accounting. This separation of queue and flow identification allows both class queuing and per flow queuing to be performed without loss of granularity for flow-based accounting. Additionally it allows for a service having class-based subflows but with aggregated accounting. Finally, the structure 128 of queues and schedulers requests a protocol data unit for link transmission when its corresponding protocol data unit reference reaches the head of its queue and becomes scheduled for transmission. The egress processor 114 then transmits the protocol data unit onto the egress link 130.

The protocol data units are segmented for transfer between the functional blocks of the egress processor 114 blocks. This segmentation is done such that the delay priorities of the protocol data units are retained; thereby allowing higher priority segments to pre-empt lower priority segments. However, it should be noted that this segmentation is not absolutely necessary but it is desirable.

Figure 7:
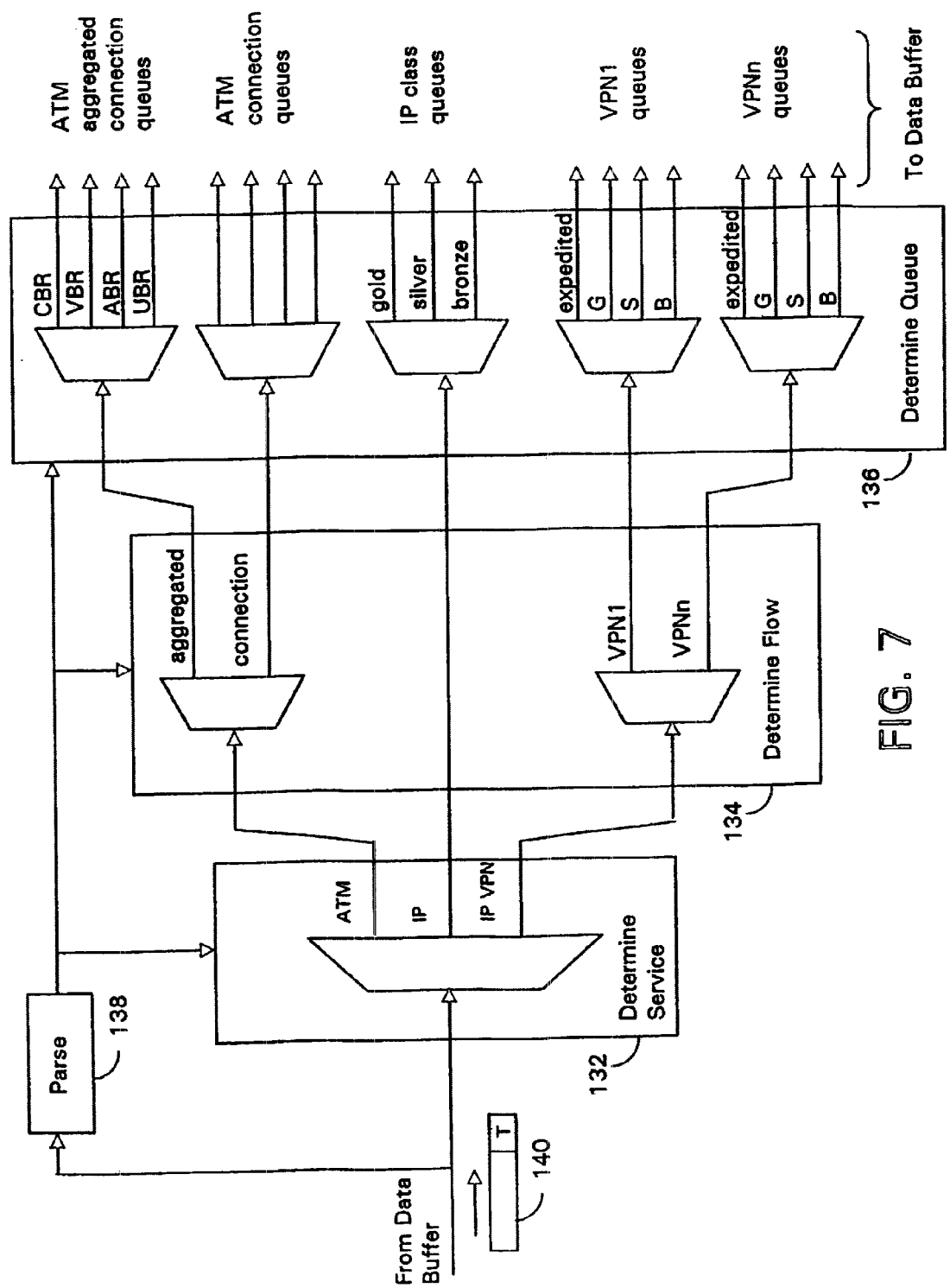
FIG. 7 is a flow diagram of part of the enqueue task of FIG. 6.

FIG. 7 is a flow diagram of an embodiment of the enqueue task 126 of FIG. 6. The method of the enqueue task 126 includes a service determination step 132, followed by a flow determination step 134, and terminated by a queue determination step 136. As mentioned previously, each protocol data unit reference is tagged with a flow identifier and a queue identifier. This tagging can either occur at the end of all the determination steps or after the determination step corresponding to the type of identifier (i.e. flow or queue).

A protocol data unit 140 encapsulated with a switching tag (T) is input to the enqueue task 126. The protocol data unit is parsed at step 138 for further examination of the switching tag (T). The service is determined at step 132 by examining the switching tag (T), which will indicate the service associated with the protocol data unit. The service will be one of several predetermined services which the switch 100 has been configured to support. For example, FIG. 7 shows the service to be one of ATM, IP or IP VPN; however, the invention is not limited to supporting only these services.

After the service has been determined, the flow is determined at step 134 by examining the switching tag (T), which will indicate the flow associated with the protocol data unit. The flow will be one of several predetermined flows which the switch 100 has been configured to support. For example, FIG. 7 shows aggregated connection and connection flows associated with ATM services, a flow associated with IP differentiated services, and VPN1 to VPNn flows associated IP VPN services. The protocol data unit reference may be tagged with a flow identifier after this step, or alternatively, after the queue has been determined.

After the flow has been determined, the queue is determined at step 136 by examining the switching tag (T), which will indicate the queue associated with the protocol data unit. The queue will be one of several predetermined queues with which the switch 100 has been configured. For example, FIG. 7 indicates queues associated with ATM aggregated connection flows on a QoS basis and queues associated with ATM connection flows on a per connection basis. The figure further indicates queues associated with IP differentiated service classes (i.e. gold, silver, bronze) on a per class basis. Finally, the figure indicates queues associated with IP VPN flows on a per sub-flow basis. That is, a queue is associated with an individual class of service (e.g. expedited, gold, silver, bronze) within a specific IP VPN. Each protocol data unit reference is assigned a queue identifier, and flow identifier if not assigned already, after the queue determination step 136 but before it is transferred to the structure 128 of queues and schedulers.

Figure 8:
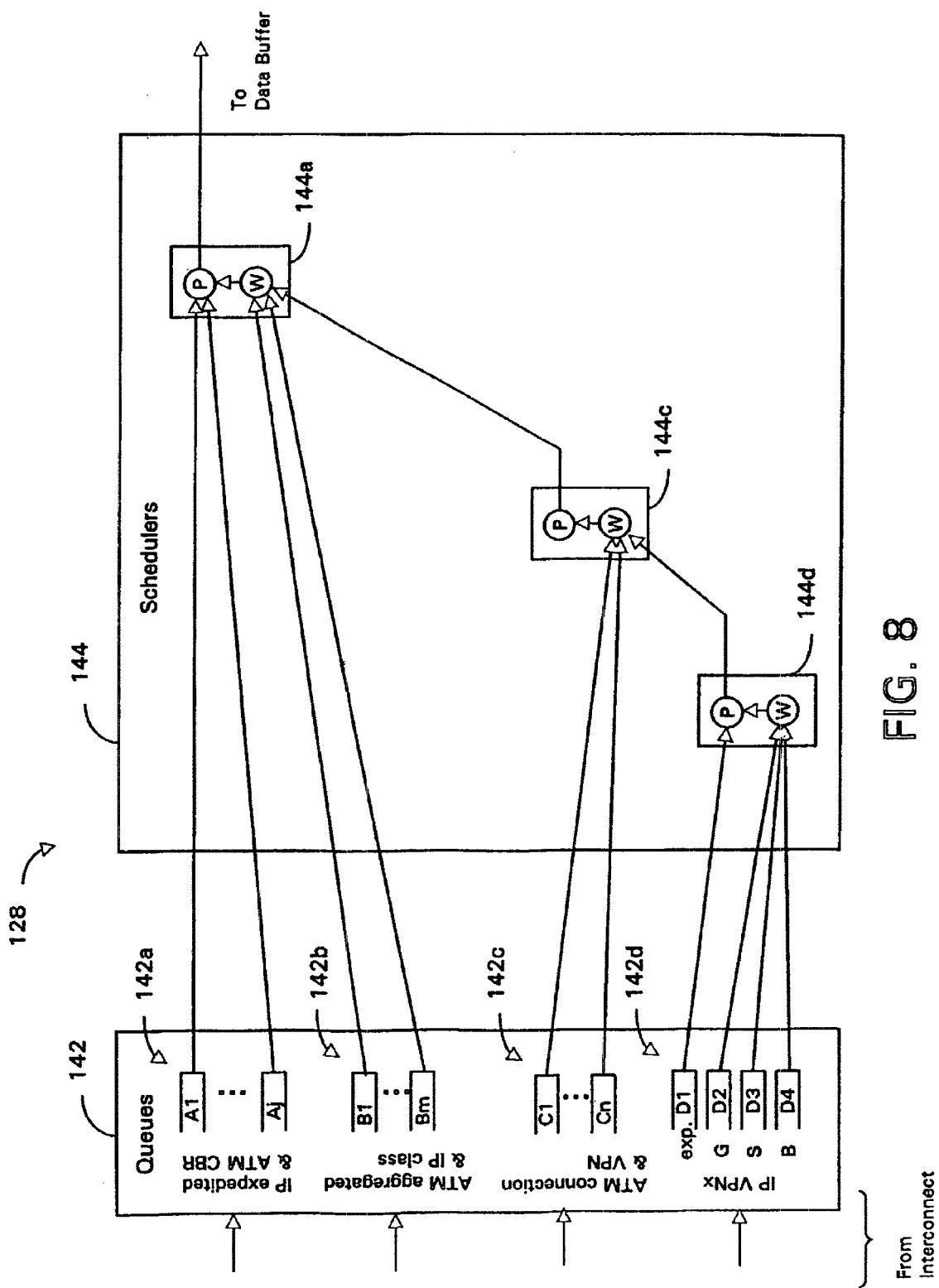
FIG. 8 is a functional block diagram of the structure of queues and schedulers of FIG. 6.

FIG. 8 is a functional block diagram of the structure 128 of queues and schedulers of FIG. 6. The structure 128 includes a plurality of queues 142, which includes groups of queues 142a, 142c, 142d and a plurality of schedulers 144. The schedulers are comprised of scheduler modules 144a, 144c, 144d each of which include a priority scheduler (P) and a WFQ scheduler (W). The queues 142 are implemented as buffers and the schedulers 144 as state machines on an integrated circuit. The queues 142 and schedulers 144 can be interconnected to support a multitude of services. The arrows in FIG. 8 show logical associations, or assignments, connecting queues to schedulers and interconnecting schedulers into a scheduling hierarchy. More specifically, the structure can be configured, and reconfigured as required, to concurrently support class-based queuing and scheduling, connection-based queuing and scheduling, and combination class and connection based queuing and scheduling.

Examples of the services requiring the above types of queuing and scheduling were given with the discussion of FIG. 7. The number of queues 142 and schedulers 144 is in the order of thousands, thus a large number of different services can be supported by the switch 100.

Referring to FIG. 8, the group of queues 142a, connected to the priority scheduler (P) of scheduler module 144a, is for absolute priority FIFO class queuing. This type of queuing is typically used for real-time low delay traffic and control traffic. Examples of the services assigned to these queues 142a are ATM CBR and IP expedited traffic. The PRI scheduler (P) of the scheduler module 144a allocates link bandwidth in strict priority order (i.e. from A1 to Aj) to the group of queues 142a.

The group of queues 142b, connected to the WFQ scheduler (W) of the scheduler module 144a, is for aggregated connection and class queuing. The WFQ scheduler (W) of the scheduler module 144a allocates weights (i.e. defined share) of link bandwidth, or can allocate explicit minimum bandwidth. If the WFQ scheduler (W) of the scheduler module 144a is work conserving, then it will also share unallocated or unused bandwidth between the group of queues 142b. The output of the WFQ scheduler (W) of the scheduler module 144a is connected to the priority scheduler (P) of the same module. The other scheduler modules 144c, 144d are the same in this regard. Note that after the priority scheduler (P) of the scheduler module 144a has allocated bandwidth to the group of queues 142a, the WFQ scheduler (W) of the same module allocates bandwidth to the group of queues 142b and the scheduler module 144c.

The group of queues 142c, connected to the WFQ scheduler (W) of the scheduler module 144c, is for connection based services that have an explicit bandwidth guarantee for an individual connection. Examples of the services assigned to these queues are ATM connection queued services and VPN services. The difference between the group of queues 142b and the group of queues 142c is that each queue in the former group aggregates flows into the same queue, while each queue in the latter group queues a single flow. The group of queues 142c is serviced by the WFQ scheduler (W) of the scheduler module 144c. The output of the scheduler module 144c is connected to the WFQ scheduler (W) of the scheduler module 144a.

The group of queues 142d and the scheduler module 144d are assigned to an IP VPN service that has class-based sub-flows. The IP VPN service (IP VPNx) is provided a guaranteed minimum bandwidth via the WFQ schedulers (W) of the scheduler module 144a and 144c. The scheduler module 144d allocates bandwidth within the IP VPN service (IP VPNx) to its class-based sub-flows. This diagram indicates that the IP VPN service (VPNx) supports a real time priority class (exp.), connected to the priority scheduler (P) of the scheduler module 144d, and three weighted class-based sub-flows (G, S, B), connected to the WFQ scheduler (W) of the scheduler module 144d. The WFQ scheduler (W) of the scheduler module 144d is used to provide weighted allocation of bandwidth guaranteed to the IP VPN service (IP VPNx) across its class-based sub-flows (G, S, B).

Referring to FIG. 8, an example of queue identifier and flow identifier assignment to a protocol data unit reference will now be described. Individual queues in the groups of queues 142a, 142b, 142c, and 142d have been assigned respective labels A1 to Aj, B1 to Bm, C1 to Cn, and D1 to D4. The subscripts j, m, and n are integers where j is greater than or equal to one, m is greater than or equal to three, and n is greater than or equal one. The following pseudo code illustrates the procedure to assign the flow and queue identifiers. In the example below a semicolon denotes the end of a single statement and where a colon has been used an "end" statement denotes the end of a sequence of multiple statements included within one branch of a conditional statement (e.g. end if).

Figure 9:
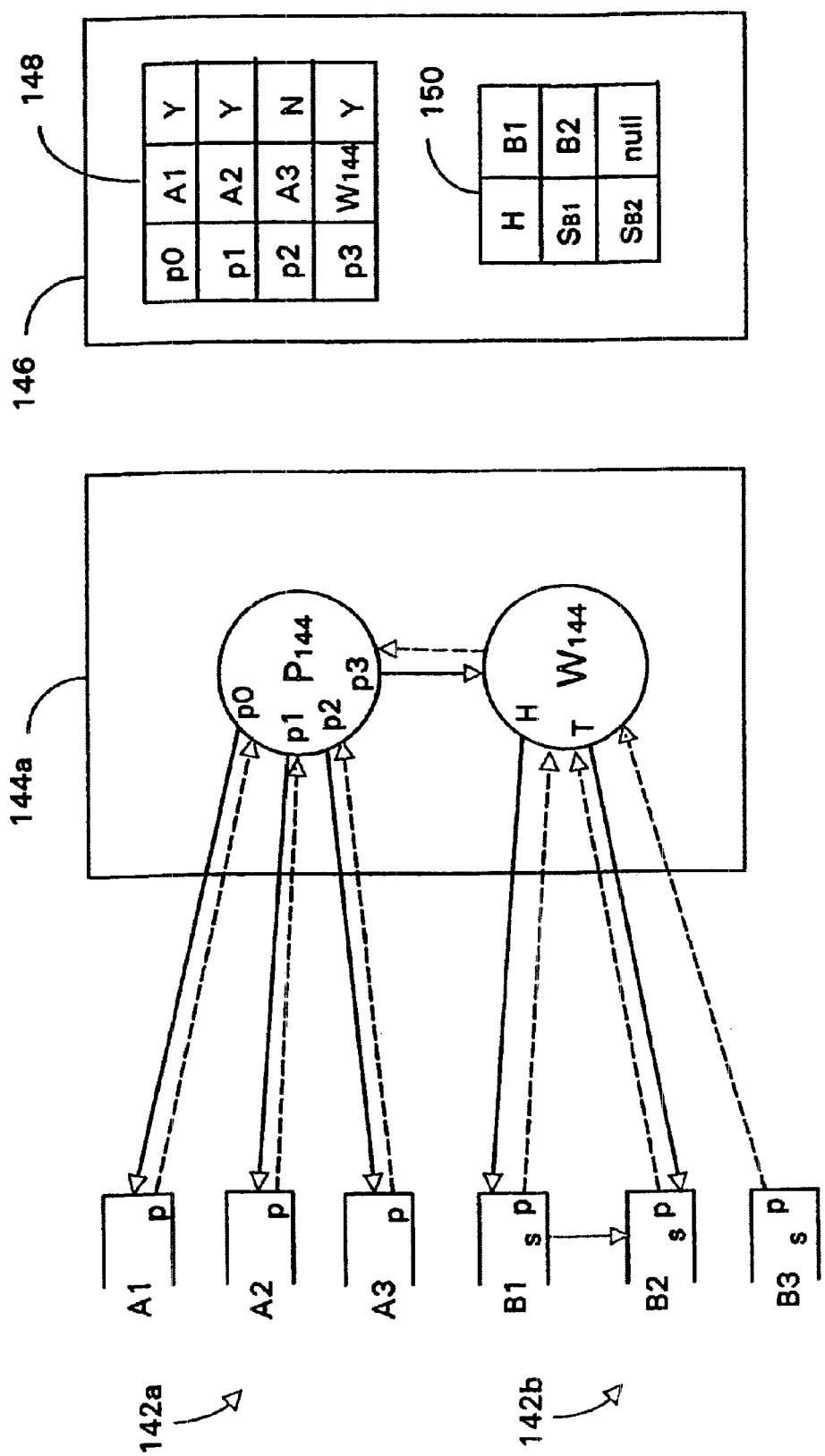
FIG. 9 illustrates the re-configurable interconnect used to interconnect the queues and schedulers of FIG. 6.

If service=IP then:
    set flowid=IP class queued;
    if service class=expedited forwarding then set qid=A1;
    if service class=gold then set qid=B1;
    if service class=silver then set qid 32 B2;
end if;
If service=ATM then:
    If flow=aggregated connection queued then:
        set flowid=ATM aggregated connection queued;
        If service class=CBR then set qid=A1;
        If service class=VBR aggregated then set qid=B3;
    end if;
    If flow=connection queued then:
        set flowid=ATM connection queued;
        If service class=VBR explicit then set qid=Cn;
        (where n is assigned to the ATM connection)
    end if;
end if;
If service=IP VPN then:
    If flow=VPNx then:
        set flowid=VPNx queued;
        if service class=expedited forwarding then set qid= D1;
        if service class=gold then set qid=D2;
        if service class=silver then set qid=D3;
    end if;
end if;

Referring to FIGS. 8 and 9 the interconnection of the queues 142 and schedulers 144 will be described. The structure 128 of queues 142 and schedulers 144 includes a re-configurable interconnect 146. The re-configurable interconnect 146 includes a linked list 148, 150. To achieve the linking, the queues 142 and schedulers 144 are defined in terms of parent and child relationships, where a parent is always a scheduler, and a child of that parent can be another scheduler or a queue. The relationships are shown as arrows in FIG. 9. A solid arrow denotes a parent to child relationship, a dashed arrow denotes a child to parent relationship, and a dotted arrow denotes a relationship between children. For example, the priority scheduler P144 of the scheduler module 144a is a parent to the group of queues 142a and a WFQ scheduler W144 of the scheduler module 144a. Likewise, the WFQ scheduler W144 is a parent to the group of queues 142b.

The priority scheduler P144 uses a linked list 148 for scheduling its children. A pointer or pointers define the list 148, a pointer being an index that uniquely identifies a particular child. Referring to FIG. 9, the pointers p0 to p3 are associated with the queues A1 to A3 and the WFQ scheduler W144, respectively. Each child also has a pointer (p) that identifies its parent, the priority scheduler P144. When a child has no data to schedule, it is identified in its parent's list as not requiring service. When such a child receives data, it must notify its parent in order to be identified in the list 148 as requiring service. Each child uses its parent pointer (p) for this purpose. The children are served in priority order from highest to lowest priority (i.e. p0 to p3). More specifically, the priority scheduler P144 services all available data of the highest priority child having data available, before moving on to service the next lower priority child having available data. Additionally, when a parent serves the last piece of data for a child, the child's entry in the list 148 is updated to indicate that service for this child is not presently required. FIG. 9 shows the linked list 148 for the priority scheduler P144 with the queues A1, A2 and the WFQ scheduler W144 having data, denoted by a "Y" in the figure, and hence requiring service. The queue A3 is shown having no data, denoted by an "N" in the linked list 148, hence this queue does not presently require service.

The WFQ scheduler W144 also uses a linked list 150 for scheduling its children. Only children requiring service (i.e. having data available) are included in this list. FIG. 9 shows the linked list 150 for the WFQ scheduler W144 with the queues B1 and B2 having data available, and the queue B3 is shown not having data available. A pointer or pointers define the list, a pointer being an index that uniquely identifies a particular child. Each child also has a sibling pointer (s) that identifies the next sibling child in the list 150. For example, scheduler module 144a has a header pointer (H) associated with the queue B1 in its linked list. The queue B1 has a sibling pointer (SB1) associated with the queue B2, which is the next sibling child in the list 150. The queue B2 has a sibling pointer (SB2) which is set to "null" because the queue B3 does not have available data in this example. The WFQ scheduler W144 also has a trailer pointer (T) associated with the last queue in the group of queues that requires service, the queue B2,in this case. When a child has no data to schedule, it is removed from its parent's list. When such a child receives data, it must notify its parent in order to be included in its parent's list. Each child has a parent pointer (p) for this purpose. For example, each queue B1 to B3 has a pointer (p) to its parent, the WFQ scheduler W144. The WFQ scheduler W144 services each of the children in its list 150 on a weighted fair queuing basis. That is, each child on the list is serviced in accordance with a weighting factor assigned to the child, whereby the amount of bandwidth that the child receives is proportional to the weighting factor. When a parent serves the last piece of data for a child the child's entry in the list 150 is removed.

Numerous modifications, variations, and adaptations may be made to the particular embodiments of the invention described above without departing from the scope of the invention, which is defined in the claims.

What is claimed is:

1. A method of switching label encapsulated protocol data units in a telecommunications switch connected into a communications network via communications links, the telecommunications switch including a switching fabric, an ingress processor, an egress processor, and a structure of queues and schedulers configured to provide class-based scheduling, flow-based scheduling, and scheduling that is a combination of class-based and flow-based scheduling, the method comprising the steps of:

receiving, by the ingress processor, a label encapsulated protocol data unit from the network over one of the communications links;

examining, by the ingress processor, the label of the label encapsulated protocol data unit;

determining, by the ingress processor and in dependence upon the content of the label, a service and a traffic flow associated with the label encapsulated protocol data unit;

encapsulating, by the ingress processor, the label encapsulated protocol data unit with a switch tag;

transferring, by the ingress processor, the switch tag encapsulated protocol data unit to the switching fabric;

switching, by the switching fabric and in dependence upon the contents of the switch tag, the switch tag encapsulated protocol data unit to the egress processor;

determining, by the egress processor and responsive to the contents of the switch tag, a queue of the structure of queues and schedulers with which the switch tag encapsulated protocol data unit is to be associated; and transmitting, by the egress processor and responsive to a scheduler of the structure of queues and schedulers indicating that the switch tag encapsulated protocol data unit is scheduled for transmission, the label encapsulated protocol data unit onto another of the communications links.

2. A method as claimed in claim 1, wherein the step of determining a queue includes determining the service associated with the switch tag encapsulated protocol data unit.

3. A method as claimed in claim 2, wherein the step of determining a queue further includes determining the traffic flow with which the switch tag encapsulated protocol data unit is associated and then associating switch tag encapsulated protocol data unit with a flow identifier.

4. A method as claimed in claim 3, wherein the step of determining a queue further includes determining a service class which the switch tag encapsulated protocol data unit is associated and then associating the switch tag encapsulated protocol data unit with a queue identifier.

5. A method as claimed in claim 2, wherein the step of determining a queue further includes determining a service class which the switch tag encapsulated protocol data unit is associated and then associating the switch tag encapsulated protocol data unit with a queue identifier.

6. A method as claimed in claim 1, wherein the method further comprises an initial step of reconfiguring the structure of queues and schedulers into another configuration.

7. A method as claimed in claim 4, wherein the service is one of a connection-oriented service and a connectionless service.

8. A method as claimed in claim 4, wherein the service is one of an ATM service, and an IP service, and an IP VPN service.

9. A telecommunications switch for switching protocol data units across communications links connecting the switch into a communications network comprising:

an ingress processor for receiving protocol data units from a communications link;

an egress processor for transmitting protocol data units onto another communications link;

a switching fabric for routing protocol data units from the ingress processor to the egress processor;

a plurality of queues including a first queue for flow-based queuing a first portion of the protocol data units routed by the switching fabric, a first group of queues for class-based queuing a second portion of the protocol data units routed by the switching fabric, and a second group of queues for flow-based with class-based subflow queuing a third portion of the protocol data units routed by the switching fabric; and a plurality of schedulers including a first scheduler assigned to the group of queues, a second scheduler operating as a priority scheduler assigned to the first queue and the first scheduler, and a third scheduler assigned to said second group of queues, the first and third schedulers being weighted fair queuing schedulers, whereby the first scheduler is assigned to the third scheduler and operable to provide scheduling of the second and third portions to the second scheduler, whereby the second scheduler is operable to provide scheduling of the first and second portions for transmission onto the another communications link.

10. A telecommunications switch as claimed in claim 9, wherein said re-configurable interconnect interconnects at least two schedulers of the plurality of schedulers in a re-configurable manner, whereby an assignment of a scheduler to another scheduler is selectively changeable.

11. A telecommunications switch for switching protocol data units between communications links connecting the telecommunications switch into a communications network, the telecommunications switch being capable of switching protocol data units of a plurality of services simultaneously and comprising:

an ingress processor for receiving protocol data units from a communications link, said ingress processor being operable to encapsulate the protocol data units with a switch tag that includes an indication of a service and a traffic flow associated with the protocol data unit, whereby the telecommunications switch can switch protocol data units of different services;

an egress processor for transmitting protocol data units onto another communications link;

a switching fabric for routing protocol data units from the ingress processor to the egress processor; and a structure of queues and schedulers associated with one of the communications links, the structure of queues and schedulers operable to provide a traffic management function and capable of being arranged to provide class-based traffic management and flow-based traffic management individually or in combination on a per service basis, the traffic management function including the queuing and scheduling of protocol data units of one or more of the plurality of services concurrently, wherein said structure of schedulers are connected to the queues by a re-configurable interconnect in a re-configurable manner, whereby the connection between a queue and a scheduler is selectively changeable.

12. A telecommunications switch as claimed in claim 11, wherein the schedulers of the structure of queues and schedulers further comprise scheduler modules and wherein each scheduler module includes a priority scheduler and a weighted-fair queuing scheduler.

13. A structure of queues and schedulers for a telecommunications switch comprising:

a plurality of queues;

a plurality of schedulers, a portion of the schedulers connected to the queues and the remainder of the schedulers interconnected to form a scheduling hierarchy operable to provide class-based scheduling, flow-based scheduling, and scheduling that is a combination of class-based and flow-based scheduling; and a re-configurable interconnect connecting the queues and schedulers in a re-configurable manner, whereby an arrangement of class-based scheduling, flow-based scheduling, and scheduling that is a combination of class-based and flow-based scheduling is selectively changeable.

14. A structure of queues and schedulers as claimed in claim 13, wherein the plurality of schedulers comprises scheduler modules and wherein each scheduler module includes a priority scheduler and a weighted-fair queuing scheduler.

15. A structure of queues and schedulers as claimed in claim 14, wherein a portion of the scheduler modules are connected to the queues by the re-configurable interconnect in a re-configurable manner, whereby a connection between a queue and a scheduler module is selectively changeable.

16. A structure of queues and schedulers as claimed in claim 14, wherein the scheduler modules not connected to queues are connected by the re-configurable interconnect to form a hierarchy of schedulers, whereby a connection between two scheduler modules is selectively changeable.

17. A structure of queues and schedulers for queuing and scheduling protocol data units for transmission in a telecommunications switch, the structure comprising:

a plurality of queues including a first queue for flow-based queuing a first portion of the protocol data units and a group of queues for class-based queuing a second portion of the protocol data units, another group of queues for flow-based with class-based sub-flow queuing a third portion of the protocol data units;

a plurality of schedulers including a first scheduler assigned to the group of queues and a second scheduler assigned to the first queue and the first scheduler, the plurality of schedulers further includes a third scheduler assigned to the another group of queues, the second scheduler being a priority scheduler, the first and third schedulers being weighted fair queuing schedulers and the first scheduler is assigned also to the third scheduler, whereby the first scheduler is operable to provide scheduling of the second and third portions to the second scheduler, whereby the second scheduler is operable to provide scheduling of the first and second portions for transmission and, re-configurable interconnect which interconnects at least two schedulers of the plurality of schedulers in a re-configurable manner.

18. A structure of queues and schedulers as claimed in claim 17, wherein said re-configurable interconnect interconnects at least two schedulers of the plurality of schedulers in a re-configurable manner.

19. A telecommunications switch as claimed in any one of claim 17, wherein the plurality of schedulers comprise scheduler modules, which modules each includes a priority scheduler and a weighted-fair queuing scheduler.

* * * * *